United States Patent
Glass et al.

(10) Patent No.: US 11,386,049 B1
(45) Date of Patent: Jul. 12, 2022

(54) SYNCHRONOUS REPLICATION END TO END LATENCY REPORTING

(71) Applicant: Tintri by DDN, Inc., Santa Clara, CA (US)

(72) Inventors: Gideon W. Glass, Los Altos, CA (US); Sumedh V. Sakdeo, San Jose, CA (US); Gauresh Datta Rane, San Jose, CA (US); Khian Thong Lim, Fremont, CA (US); David Brian Milani, Sunnyvale, CA (US)

(73) Assignee: Tintri by DDN, Inc., Santa Clara, CA (US)

( * ) Notice: Subject to any disclaimer, the term of this patent is extended or adjusted under 35 U.S.C. 154(b) by 269 days.

(21) Appl. No.: 16/115,134

(22) Filed: Aug. 28, 2018

Related U.S. Application Data

(60) Provisional application No. 62/551,152, filed on Aug. 28, 2017.

(51) Int. Cl.
  *G06F 16/00* (2019.01)
  *G06F 7/00* (2006.01)
  *G06F 16/178* (2019.01)
  *G06F 9/455* (2018.01)

(52) U.S. Cl.
  CPC ........ *G06F 16/178* (2019.01); *G06F 9/45558* (2013.01)

(58) Field of Classification Search
  CPC ...... G06F 16/27; G06F 16/178; G06F 16/273; G06F 9/45558; G06F 2009/4557
  USPC ......................................................... 707/611
  See application file for complete search history.

(56) References Cited

U.S. PATENT DOCUMENTS

| | | | |
|---|---|---|---|
| 10,114,582 B1* | 10/2018 | Rao | G06F 11/3485 |
| 2013/0282994 A1* | 10/2013 | Wires | G06F 9/45558 711/158 |
| 2015/0074060 A1* | 3/2015 | Varadharajan | G06F 16/188 707/649 |
| 2015/0293830 A1* | 10/2015 | Bhide | G06F 9/45558 718/1 |
| 2016/0028806 A1* | 1/2016 | Wareing | H04L 67/1021 709/217 |
| 2016/0127462 A1* | 5/2016 | Mu | H04L 67/1097 709/219 |
| 2016/0378389 A1* | 12/2016 | Hrischuk | G06F 3/0631 711/154 |

* cited by examiner

*Primary Examiner* — Raquel Perez-Arroyo
(74) *Attorney, Agent, or Firm* — Van Pelt, Yi & James LLP

(57) ABSTRACT

Synchronous replication end to end latency reporting is disclosed. In various embodiments, performance data associated with processing and replicating synchronously file system operation requests from a primary storage system to a secondary storage system is received from a data storage system via a communication interface. Performance data associated with an application-level workload is aggregated. A representation of the aggregated performance data for the application-level workload is provided via a user interface.

16 Claims, 8 Drawing Sheets

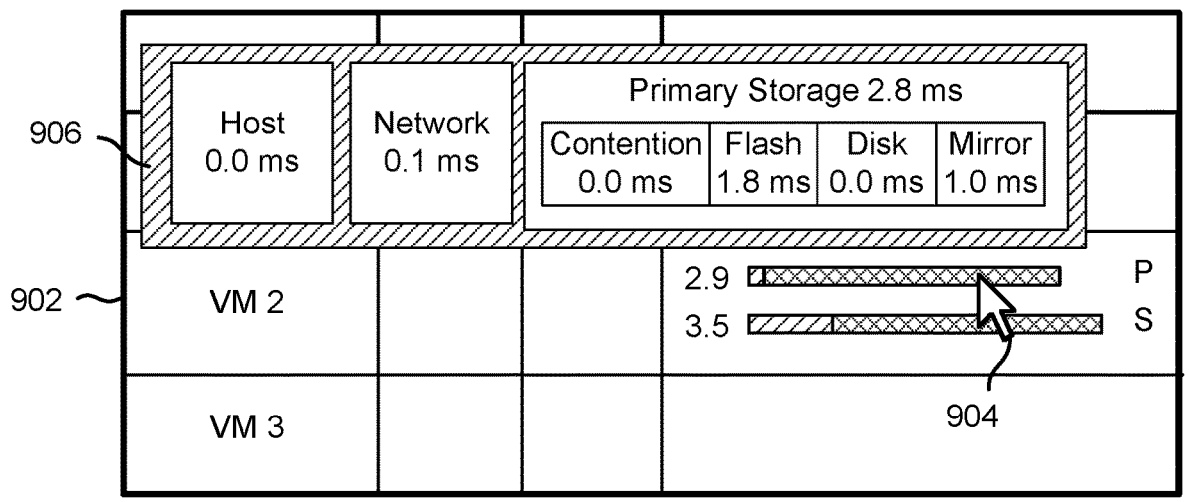
FIG. 9A
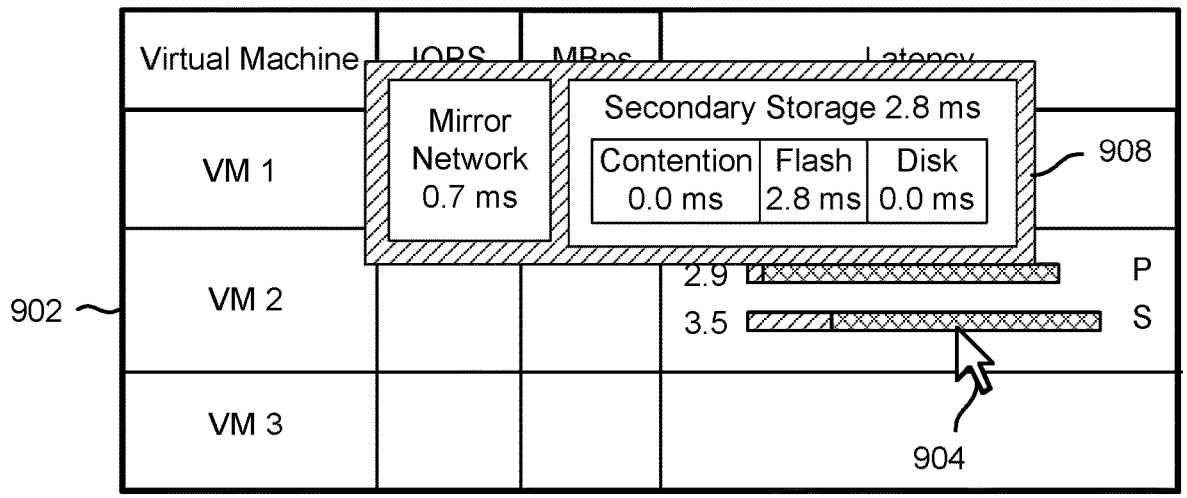
FIG. 9B
FIG. 9C

SYNCHRONOUS REPLICATION END TO END LATENCY REPORTING

CROSS REFERENCE TO OTHER APPLICATIONS

This application claims priority to U.S. Provisional Patent Application No. 62/551,152 entitled SYNCHRONOUS REPLICATION END TO END LATENCY REPORTING filed Aug. 28, 2017 which is incorporated herein by reference for all purposes.

BACKGROUND OF THE INVENTION

Synchronous replication refers to a data protection technique in which operations affecting stored data are completed at both a primary and second storage system before the operation is acknowledged to the host that requested the operation.

Synchronous replication imposes costs, such as added storage system capacity (to store the replicated copy), network bandwidth (to replicate storage system operations across the network), and delay (e.g., the primary storage system may have to wait for the secondary storage system to indicate it has completed the operation at the secondary storage system). These costs may be worthwhile or not, depending on the nature of the data, etc. Administrators may benefit from tools to analyze the costs associated with synchronous replication with respect to various application workloads and/or to troubleshoot the source and/or cause of costs greater than may be expected.

BRIEF DESCRIPTION OF THE DRAWINGS

Various embodiments of the invention are disclosed in the following detailed description and the accompanying drawings.

FIG. 9A is a block diagram illustrating an embodiment of a user interface to display performance statistics associated with a logical synchronous replication system.

FIG. 9B is a block diagram illustrating an embodiment of a user interface to display performance statistics associated with a logical synchronous replication system.

FIG. 9C is a block diagram illustrating an embodiment of a user interface to display performance statistics associated with a logical synchronous replication system

DETAILED DESCRIPTION

Figure 1:
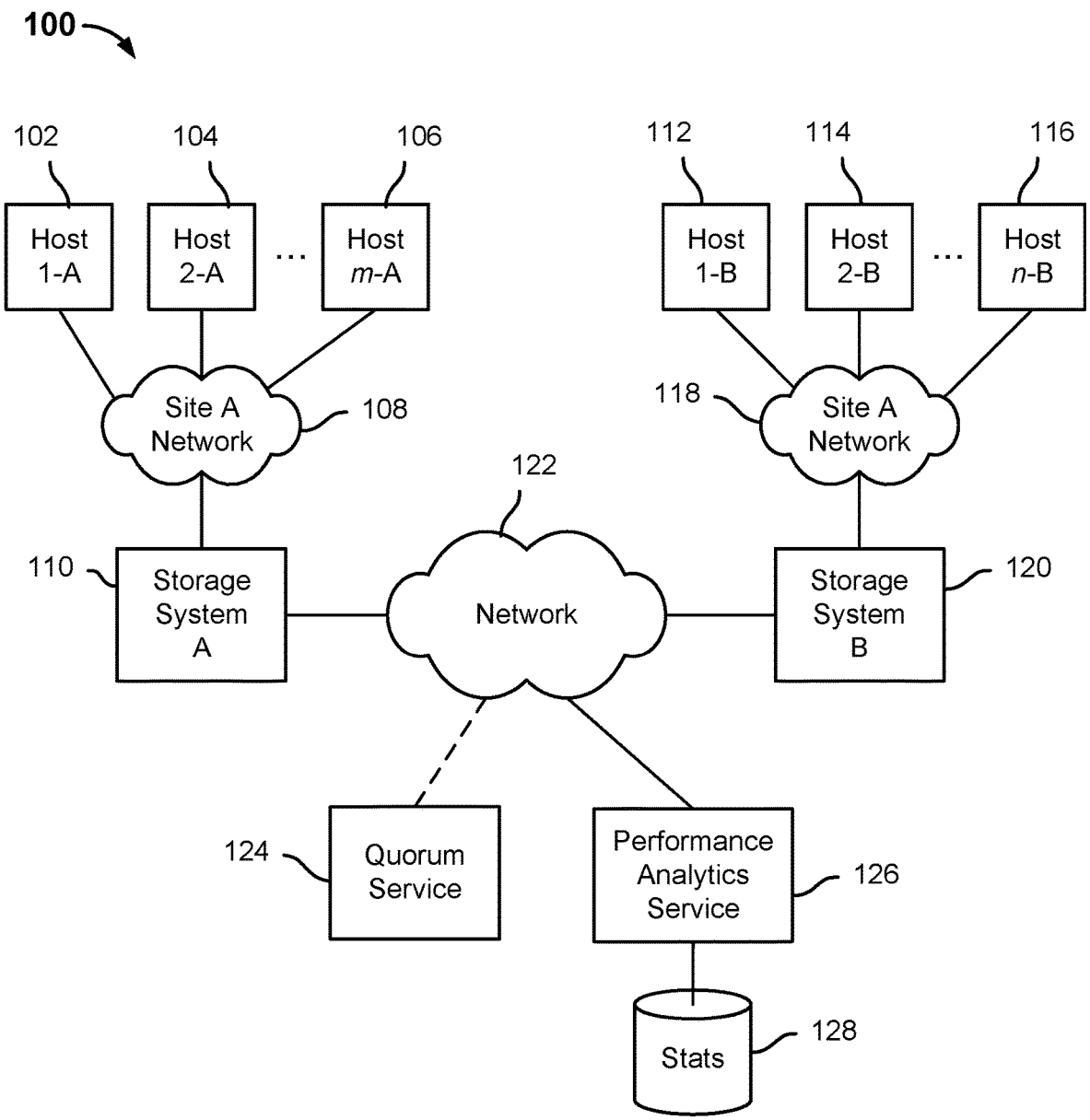
FIG. 1 is a block diagram illustrating an embodiment of a logical synchronous replication system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to calculate and report end to end I/O latency are disclosed. The calculation and reporting may be applied for various operations including read and write operations. In various embodiments, the operations are performed as part of logical synchronous replication. The additional costs (e.g., delay) associated with logical synchronous replication are broken out and displayed in various embodiments.

In various embodiments, synchronous replication refers to operations on one storage system, the Primary, being received from external clients and then replicated to another storage system, the Secondary. Receipt of operations at the Secondary is acknowledged by the Secondary to the Primary, and finally the Primary acknowledges the operation to the host client. In this manner, all operations are seen and are persisted on stable storage (e.g., non-volatile memory) on both the Primary and Secondary storage systems. In the event of a failure of one storage system (or the data center or entire site housing that storage system), the other system contains a copy of all acknowledged operations. No data is lost. The storage systems may be separated by arbitrary distances and network topologies.

In various embodiments, logical synchronous replication is performed. In various embodiments, logical synchronous replication refers to replication being performed on the basis of discrete filesystem operations (or, in some embodiments, storage system operations more generally). There are different types of filesystem operations. The most simple example operation is a write operation, affecting a specified file, at a specified byte offset, for a specified number of bytes.

In various embodiments, a write operation is replicated synchronously to a secondary storage system, and is not acknowledged as having been completed unless/until both the primary storage system and the secondary storage system have completed the operation on the corresponding file as stored at the primary storage system and the secondary storage system, respectively. In various embodiments, the added cost of performing synchronous replication are calculated, retained, and displayed separately from other costs, enabling an administrative user interface or other display to be provided in which the added cost of synchronous replication and the specific requirements contributing to such added costs (e.g., mirror network delay, delays in processing the request at the secondary storage system, e.g., due to contention, flash access times, etc.) are displayed.

In one aspect, the techniques described herein may allow users to understand the impact that replication has on user- and host-visible I/O performance. In another aspect, the techniques described herein may allow storage system administrators to identify causes of performance problems simply and easily, and, correspondingly, to tell at a glance whether a system is operating as expected.

FIG. 1 is a block diagram illustrating an embodiment of a logical synchronous replication system. In the example shown, storage system 100 includes a plurality of hosts, represented in FIG. 1 by hosts 102, 104, and 106, connected via a first site storage network 108 to a first storage system 110. In the example shown, the first site network 108 and first storage system 110 are denoted as site and system "A", respectively. Examples of hosts 102, 104, and 106 include, without limitation, virtual machine (VM) hypervisors configured to create, provide, and manage virtual machines. In some embodiments, the hosts 102, 104, and 106 and their associated virtual machines are organized as a "cluster" and use a shared cluster IP address to send file system operation requests to the storage system 110.

The example shown in FIG. 1 further includes a second plurality of hosts, represented in FIG. 1 by hosts 112, 114, and 116, which are connected via a second site network "B" 118 to a second storage system 120. In the example shown, hosts 112, 114, and 116 may be organized and designated as a second cluster associated with a second cluster IP address.

In the example shown, storage system 110 and storage system 120 are connected via network 122 (e.g., a local or wide area network), and via network 122 each is connected to a quorum service 124. Quorum service e124 is optional in some embodiments. In some embodiments, quorum service 124 may be involved in determining whether a secondary storage system as disclosed herein will become the primary storage system with respect to one or more cluster IP addresses, as described more fully below.

Logical synchronous replication of file system operations, or other logical storage system operations, is disclosed. Referring further to FIG. 1, in various embodiments a cluster, such as hosts 102, 104, and 106, may be configured to use a first storage system, such as storage system 110, as a primary storage system. The primary storage system may be configured to synchronously replicate at least some file system operations, e.g., write operations, operations to truncate a file, reserve space, etc., to a secondary storage system. For example, storage system 110 may be configured to synchronously replicate at least some file system operations requested by hosts 102, 104, and 106, across network 122 to storage system 120.

In various embodiments, logical synchronous replication may be performed, e.g., with respect to files associated with critical application-level workloads. For example, in some embodiments, hosts 102, 104, and 106 are hypervisors configured to store files comprising virtual machine data on storage system 110. In some embodiments, an administrative user interface is provided to enable an administrator to designate a subset of files and/or VM's for logical synchronous replication. In some embodiments, files for VM's for which synchronous replication is desired are stored in a subdirectory for which synchronous replication has been configured. Files not desired to be synchronously replicated, e.g., files associated with less mission critical virtual machines, may be stored in a root or other top level directory, or in a subdirectory not designated for synchronous replication.

In various embodiments, file system operation requests received at a primary storage system are checked to determine whether synchronous replication is required. If not the operation is performed locally and acknowledged to the requesting host. If so, the request is replicated to the configured secondary storage system (e.g., replicated from storage system 110 to storage system 120 over network 122, in the example shown in FIG. 1) and perform locally, and the request is not acknowledged to the requesting host, indicating completion, until it has been completed on the primary storage system (e.g., 110) and a response has been received from the secondary storage system (e.g., 120) indicating the file system operation has been completed on the secondary storage system.

In some embodiments, a storage system that is a secondary storage system with respect to one cluster may be the primary storage system for another cluster, e.g., one that is (more nearly) collocated with the second storage system. The latter system may be configured to synchronously replicate to the storage system for which it is serving as a secondary storage system with respect to one cluster IP address file system operations requested with respect to the cluster for which it is the primary storage system. For example, in the example shown in FIG. 1, storage system 120, which is the secondary storage system for the cluster comprising hosts 102, 104, and 106, and which is the primary storage system for hosts 112, 114, and 116, may be configured in some embodiments to synchronously replicated to storage system 110 file system operations requested by hosts 112, 114, and 116.

In various embodiments, upon failure of a primary storage system the secondary storage system for a cluster for which the failed storage system was the primary storage system may become the primary storage system for the cluster. In various embodiments, failover is effected quickly, transparently (to hosts), and free of data loss by virtue of the secondary storage system having been kept synchronized up to the minute with the primary storage system, coupled with the fact that the same cluster IP address, file handles, etc. are used by the cluster hosts to send requests to the secondary-now-become-primary storage system as had been used with the failed primary storage system. In some embodiments, a cluster IP address is selected within a range within which both the primary storage system (e.g., 110) and the secondary storage system (e.g., 120) are reachable. In addition, the same global file identifiers are used at least externally by the primary storage system and the secondary storage system, such that same file handles may continue to be used by hosts after failover. In some embodiments, the globally-unique file identifier includes a "datastore UUID" (UUID or "universally unique identifier") created by the primary storage system to identify a subdirectory with respect to which logical synchronous replication as disclosed herein has been configured and a filed ID that is unique within that replicated datastore (subdirectory), e.g., a monotonically increasing sequence number that can only be incremented by a storage system that is serving as primary with respect to the datastore.

Referring further to FIG. 1, in various embodiments the primary storage system, e.g., 110, and the secondary storage system monitor their connectivity to each other, e.g. via heartbeats, times between communications, etc. In some embodiments, if the secondary storage system determines the primary storage system may have failed (e.g., software crash, hardware failure, loss of connectivity to secondary storage system and the cluster hosts, the secondary storage system may contend to become the primary storage system for the cluster (i.e., failover). In some embodiments, the secondary storage system (e.g., 120) checks with the quorum service 124 to determine whether to become primary. If the quorum system 124 remains connected to the primary storage system (e.g., 110) and there is no indication to the quorum service 124 that the primary storage system has become unavailable, the quorum service 124 may tell the secondary storage system 120 that it may not become primary. In such circumstances, the secondary storage system remains secondary (at least for the time being) and attempts to reestablish its connection to the primary storage system. Meanwhile, the primary storage system may continue to operate as the primary storage system and may at the same time work to reestablish its connection to the secondary storage system. In various embodiments, depending on how it is configured, the primary storage system may continue to accept, process, and acknowledge file system operations (availability favored over ensuring zero data loss through replication), at least for a time, and may work to "catch up" on replication once a connection is restored.

If the secondary storage system (e.g., 120) asks the quorum service 124 if it can become the primary storage device (failover) and the quorum system 120 agrees (e.g., it also has lost connectivity to the primary storage system 110), the secondary storage system 120 becomes the primary storage system with respect to the cluster IP address (e.g., used by hosts 102, 104, and 106). The newly-primary storage system 120 begins to accept connections to the cluster IP address, begins to receive and process file system operation requests, begins to replicate to an available destination storage system, etc.

Referring further to FIG. 1, in the example shown, system 100 includes a performance analytics service 126 connected via network 122 to storage system 110 and storage system 120. In various embodiments, the storage systems 110, 120 are configured to storage system performance data to performance analytics service 126 via network 122 reflecting the time associated with performing different aspects of file system operations, including synchronous replication. For example, for file system operation performed with respect to files associated with a cluster IP with respect to which the reporting storage system 110, 120 is the primary storage system, the storage system may report latency times associated with receiving requests from hosts (network transmission delay from hosts to storage system), delays due to contention between competing requests (e.g., delays due to the volume, relative priority, etc. of requests), delays due to flash storage access times, and finally any additional delay associated with replicating operations synchronously to a secondary storage system, as observed by the primary storage system. The latter delay in some embodiments includes time associated with deciding whether a given operation is to be replicated synchronously, sometimes referred to herein as "barrier" delay, and the time (if any) between completing operations locally and receiving acknowledgement the corresponding operation has been completed at the secondary storage system to which it has been synchronously replicated. For operations with respect to which a reporting storage system is the second storage system, reported statistics may include mirror network delay as observed by the secondary storage system, and contention, flash access, or other latency observed by the secondary storage system with respect to replicated operations.

In the example shown, statistics are stored performance by performance analytics service 126 in a storage system performance statistics database 128. In various embodiments, performance analytics service 126 aggregates and processes reported statistics on a per-file or per-file group basis. For example, in some embodiments, the cluster hosts comprising virtual machine (VM) hypervisors, and the storage systems 110, 120 are configured to track at the storage system level which files are associated with which virtual machines. For example, in some embodiments, the storage systems 110, 120 extract from file creation requests data to associate a file with its corresponding VM. File operations to a file associated with a VM are associated with the VM and performance data is reported on a per-file and/or per-VM basis. In some embodiments, the storage systems 110, 120 report statistics on a per-VM basis. In some embodiments, the performance analytics service 126 aggregates statistics on a per-VM basis, and provides reports/displays that break out performance data on a per-VM basis, including the added latency (if any) associated with synchronously replicating file system operations associated with a given VM (or other application workload).

Figure 2:
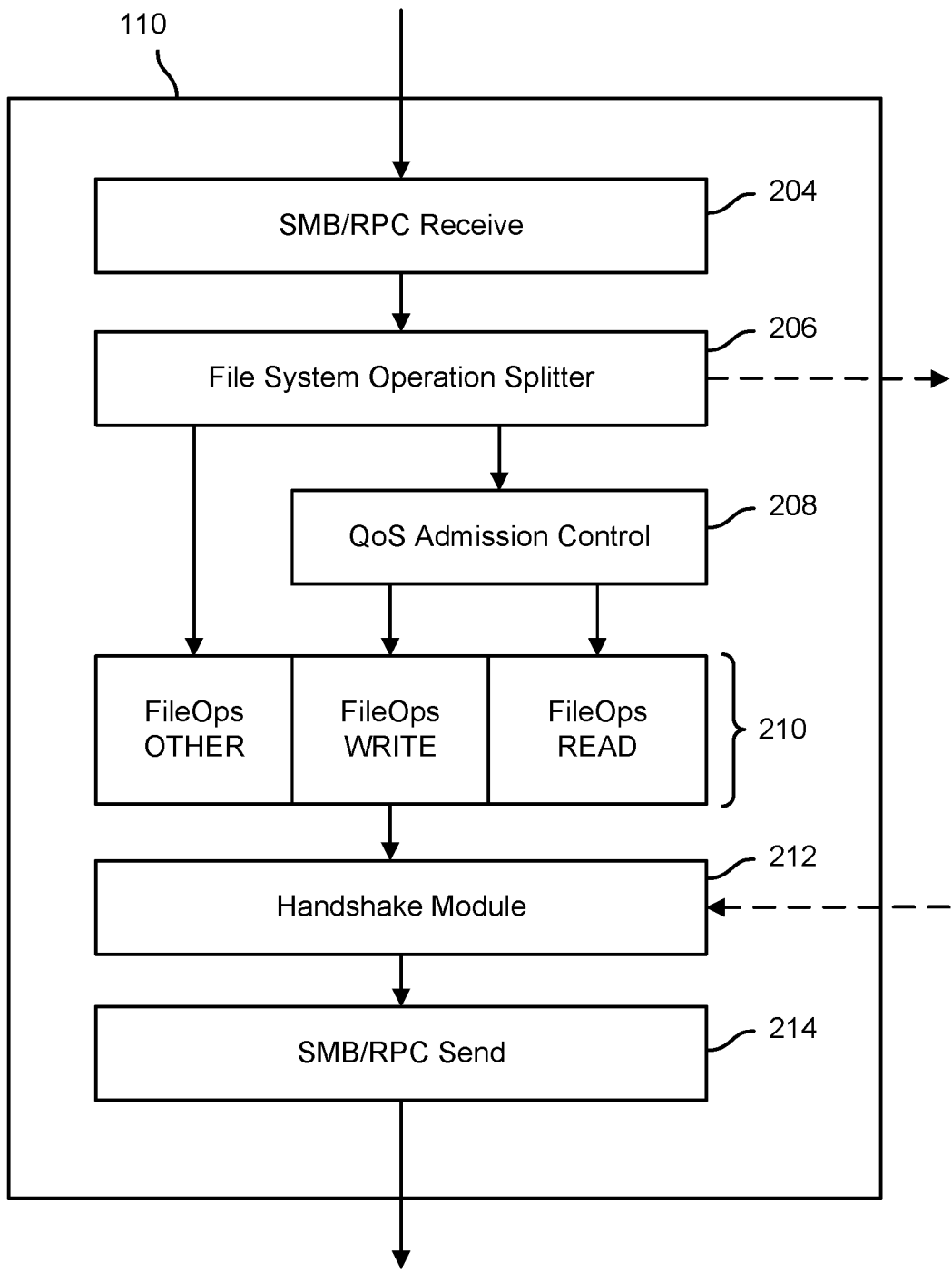
FIG. 2 is a block diagram illustrating an embodiment of a storage system configured to perform logical synchronous replication.

FIG. 2 is a block diagram illustrating an embodiment of a storage system configured to perform logical synchronous replication. In the example shown, a storage system, such as storage system 110 (or 120) of FIG. 1, includes the functional modules shown in FIG. 2. In various embodiments, the functional modules shown are provided by configuring one or more of a processor, a communication interface (e.g., a network interface card or NIC), and a memory or other data storage device to provide the function. In the example shown, network file system (NFS) file system operation requests are received at module 204 from application hosts (e.g., hosts 102, 104, and 106 in FIG. 1) in the form of remote procedure calls (RPC) sent using the server message block (SMB) protocol. The file system operation requests are provided to file system operation splitter 206, which in various embodiments determines whether the file system operation is required to be synchronously replicated. For example, file system operation splitter 206 may determine that a file with which a received file system operation request is associated resides in a subdirectory the storage system 110 is configured to replicate synchronously to a secondary storage system, as represented in FIG. 2 by the dashed-line arrow emanating from file system operation splitter 206.

In the example shown, whether replicated or not, read and write operations are sent to a quality of service control module 208 for controlled admission to corresponding operational modules 210 while operations not comprising a read or a write operation are sent directly to the corresponding operational module 210. Once completed locally, requests are passed to a "handshake" module 212. Acknowledgements from a second storage system indicating completion of a request replicated synchronously to the secondary storage system are received as well at handshake module 212, as indicated by the dash-line arrow shown going into module 212. For replicated requests, only after the handshake module 212 has received indications of completion from both the local operation module 210 and the secondary storage system is an acknowledgement/success message sent to the requesting host via SMB/RPC send module 214.

Figure 3:
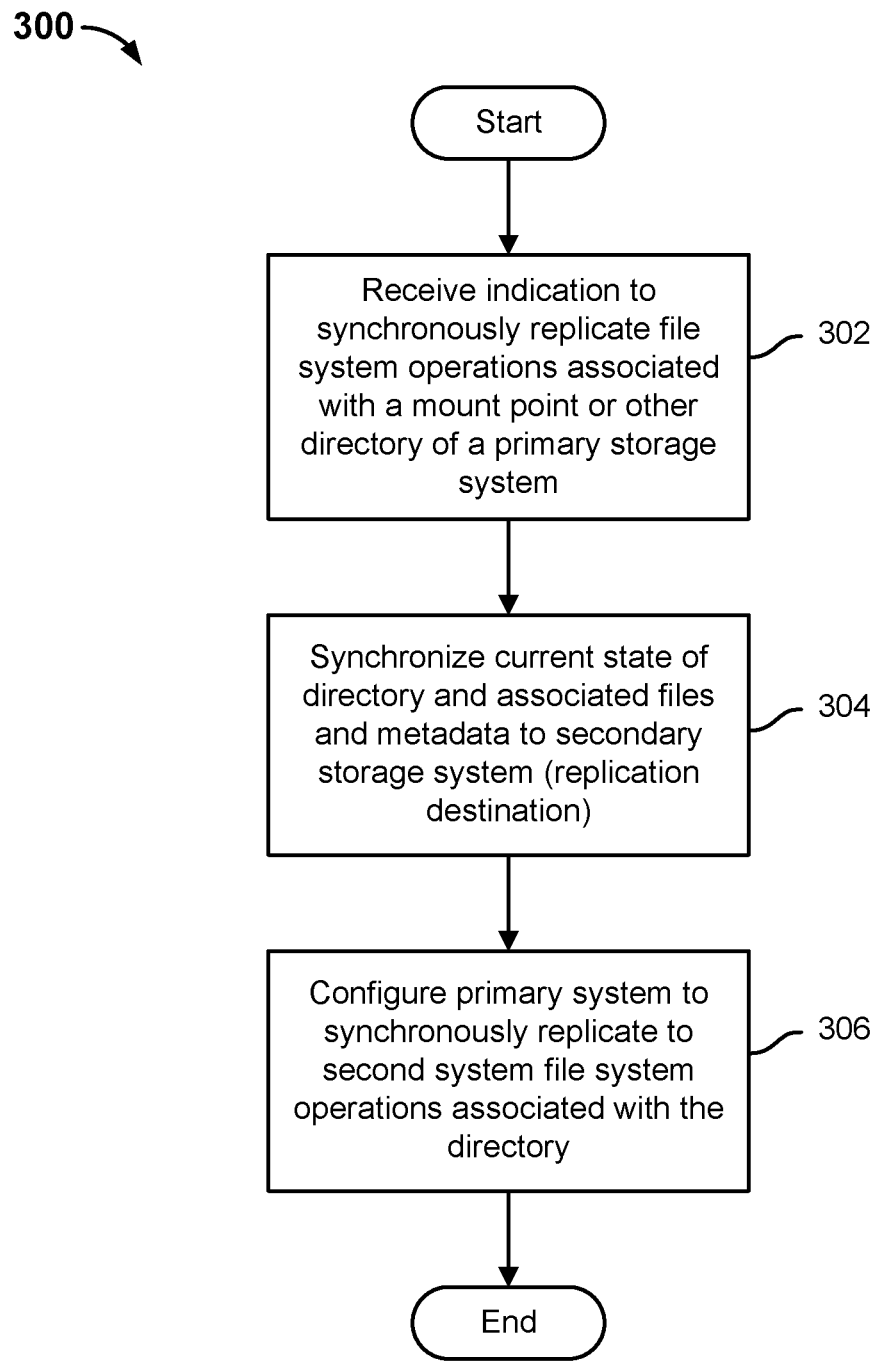
FIG. 3 is a flow chart illustrating an embodiment of a process to perform logical synchronous replication.

FIG. 3 is a flow chart illustrating an embodiment of a process to perform logical synchronous replication. In various embodiments, the process 300 of FIG. 3 may be performed on and/or with respect to a primary storage system, e.g., storage system 110 of FIG. 1. In the example shown, an indication is received to synchronously replicate file system operations associated with a mount point or other directory (e.g., subdirectory) of a primary storage system (302). For example, in the case of a storage system configured to store files associated with virtual machines, a set of mission-critical virtual machines (or other mission critical application workloads) may have been designated as "critical" and/or otherwise identified for synchronous replication. In response, files associated with the virtual machines (or other application workloads) so designated may be stored in a subdirectory designated to be replicated synchronously. In some embodiments, an administrator may select workloads to be protected via synchronous replication and may manually place associated files in a subdirectory designated for synchronous replication. Once synchronous replication is configured, a current state of the subdirectory to be replicated synchronously, including the associated files as they exist prior to synchronous replication starting and associated file system metadata, is synchronized to the secondary storage system (304). The primary storage system is configured to synchronously replicate to the secondary storage system file system operations requested to be performed with respect to files in the subdirectory designated for synchronous replication (306).

Figure 4:
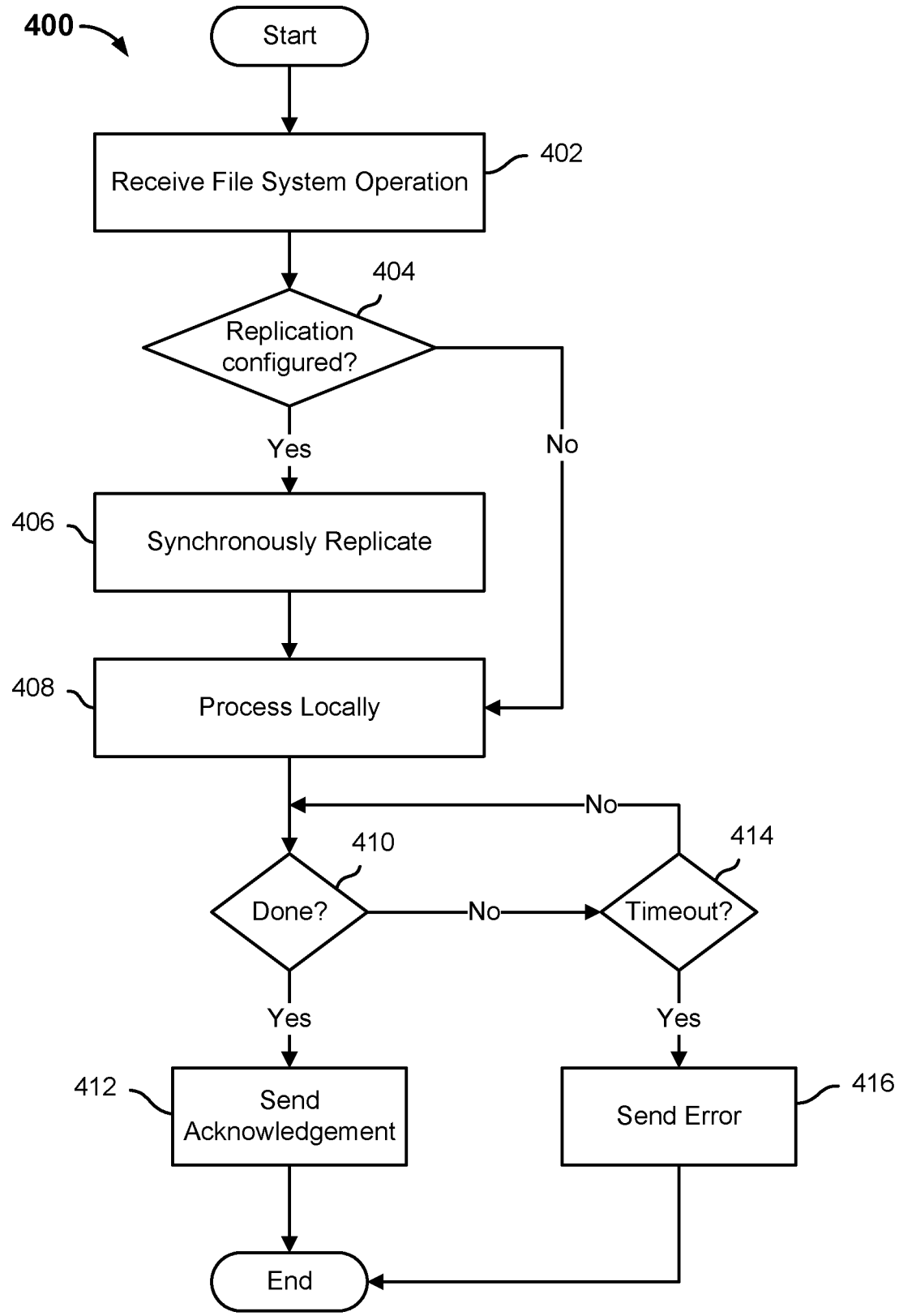
FIG. 4 is a flow chart illustrating an embodiment of a process to perform logical synchronous replication selectively.

FIG. 4 is a flow chart illustrating an embodiment of a process to perform logical synchronous replication selectively. In various embodiments, a primary storage system configured to perform logical synchronous replication selectively of file system operations requested with respect to files in one or more subdirectories designated for synchronous replication, for example, implements the process 400 of FIG. 4. In the example shown, a file system operation request is received (402). It is determined whether the request is one to be synchronously replicated to a secondary storage system (404). For example, a determination may be made as to whether the request relates to a file in a subdirectory configured for synchronous replication. If the request is one determined to be required to be replicated synchronously (404), the request is sent to the secondary storage system for synchronous replication (406) and also performed locally (408), i.e., at the primary storage device. If the operation relates to a file with respect to which synchronous replication is not configured to be performed and/or is not of a type with respect to which replication is configured to be performed (e.g., a read request) (404), the operation is performed only locally (408). It is determined whether the operation has been completed successfully (410). In the case of a synchronously replicated request, successful completion may require receiving indications from the local operational module and the secondary storage system that the operation has been completed may be required. If the operation is determined that the operation has been completed (locally and, if required, at the secondary storage system) (410), an acknowledgement is sent to the client/host from which the request was received (412). If the request is not determined to be completed (410) prior to a timeout (414), an error message is sent (416) and the process ends.

Timing of local processing and remote processing of a replicated file system operation, e.g., a write operation, can vary based on a variety of factors. Remote processing may incur overhead associated with an operation traversing a replication network between the Primary and Secondary storage systems. Thus, usually the local operation completes first, and the handshake module processing waits (typically on the order of a few milliseconds to a few hundred microseconds) for an acknowledgement that remote processing has completed. In some instances, a remote operation may complete prior to a local operation. For example, if aspects of the storage system on the Primary system are more heavily loaded than the Secondary, and/or the replication network latency is relatively low, then remote processing may complete sooner than the local processing. In this case, the overhead due to splitting write operations is effectively zero.

Figure 5A:
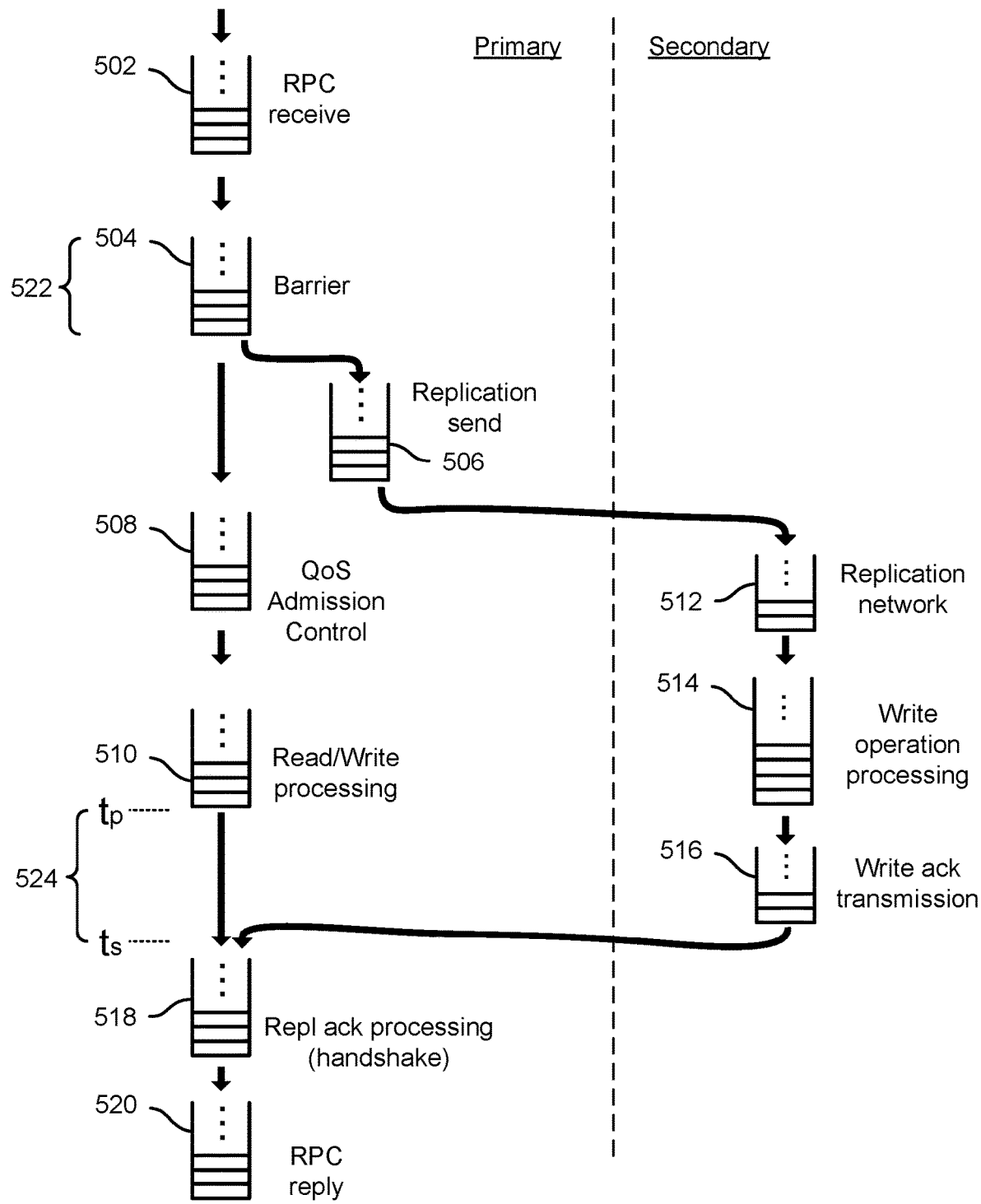
FIG. 5A is a block diagram illustrating an embodiment of a logical synchronous replication system.

FIG. 5A is a block diagram illustrating an embodiment of a logical synchronous replication system. In various embodiments, the processing illustrated in FIG. 5A is performed by a storage system comprising a primary storage system and a secondary storage system to which file systems operations are synchronously replicated, such as storage systems 110 and 120 of FIGS. 1 and 2.

In the example shown, a file system operation request is received and added to an RPC receive queue 502. The request is processed via a "barrier" queue 504 to determine whether the request is to be replicated synchronously. If the request is determined to be replicated synchronously, e.g., it is associated with a file that resides in a subdirectory for which synchronous replication has been configured, the request is added to a replication send queue 506. Whether the request is replicated synchronously or not, the request is added (also) to a QoS Admission Control queue 508 for quality of service-based admission to a read/write processing queue 510.

The replicated request is sent to the secondary storage system via a replication network 512 having an associated latency, and is added to a write processing queue 514 at the secondary storage system. Upon completion of the requested file system operation at the secondary storage system, an acknowledgement is added to a write acknowledgement transmission queue 516.

Upon completion of the write locally, an indication of completion is sent to the handshake module, represented in FIG. 5A by replication acknowledgement processing queue 518. In the example shown in FIG. 5A, local processing of a synchronously replicated file system operation is completed prior to receipt at the primary storage system of acknowledgement from the secondary storage system that the file system operation has been completed at the secondary storage system. In some embodiments, the handshake module checks upon receiving an indication a file system operation (e.g., a write) has been completed locally whether the corresponding acknowledgement has been received from the secondary storage system to which the operation was replicated synchronously. If not, as in the example shown in FIG. 5A, the handshake module waits for the acknowledgement from the secondary storage system. Upon receipt, the request is added to the RPC reply queue 520 for acknowledgement to the requesting client/host and the handshake module reports the added delay (if any) associated with waiting for the acknowledgement to arrive from the secondary storage system.

In the example shown in FIG. 5A, the file operation splitting delay 524, equal to the time delay between local completion and receipt of acknowledgement of completion at the secondary storage system, or ts-tp in this example, would be computed and reported for the operation. In various embodiments, in the example shown in FIG. 5A the added latency associated with synchronous replication would be reported by the primary storage system and/or computed by the performance analytics service as being the sum of the barrier latency 522 and the file operation splitting delay 524.

Figure 5B:
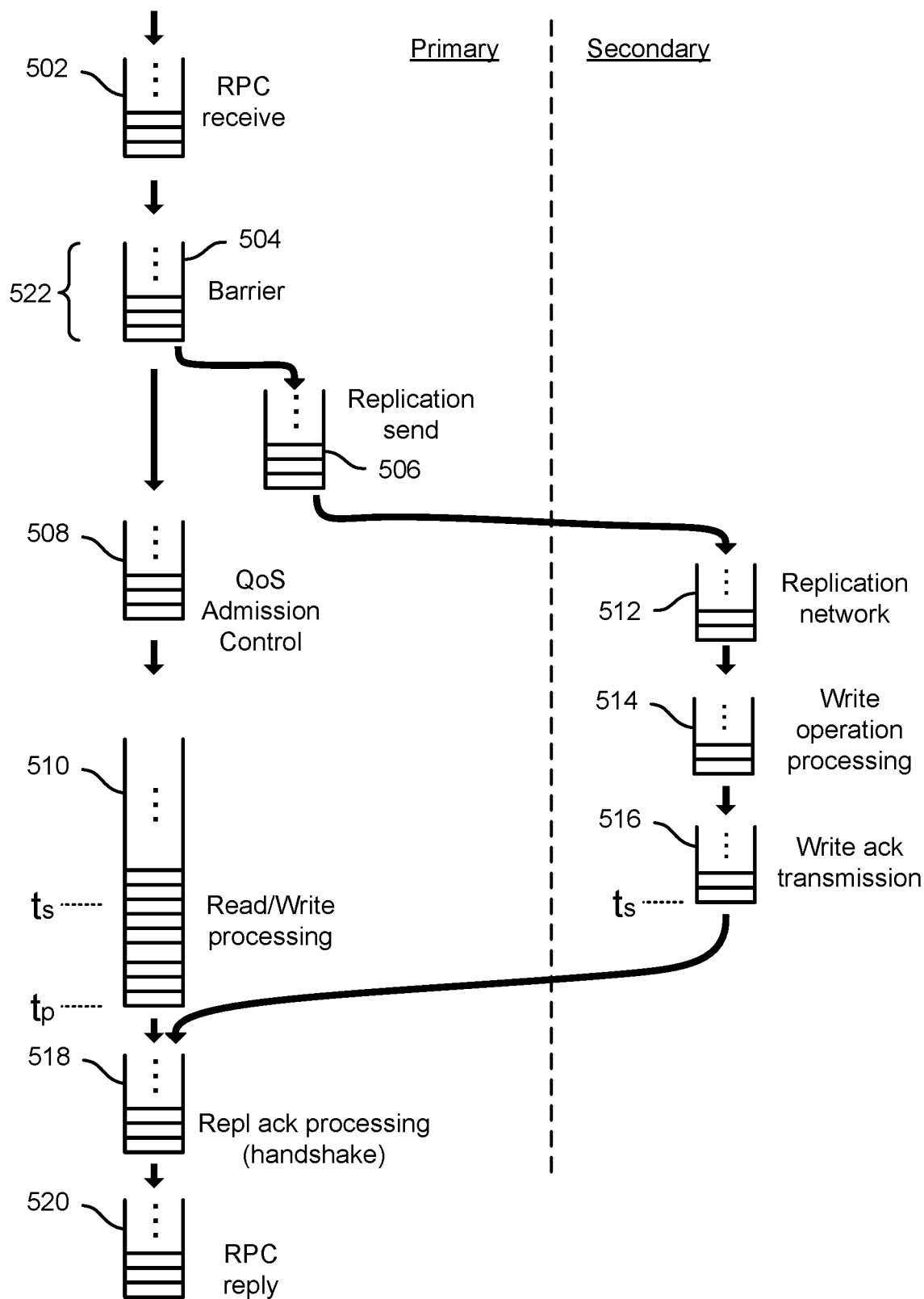
FIG. 5B is a block diagram illustrating an embodiment of a logical synchronous replication system.

FIG. 5B is a block diagram illustrating an embodiment of a logical synchronous replication system. In the example shown in FIG. 5B, the acknowledgement of completion arrives from the secondary storage system before the corresponding local operation is completed, resulting in effectively zero file operation splitting delay. Such a circumstance may occur, by way of example and without limitation, in cases in which the primary storage system is experiencing a technical problem, e.g., in accessing flash storage; an excessive number of file system operations; a disproportionate number of file system operations that are not being replicated; etc. In such as circumstance, the delay associated with synchronous replication would reflect only the barrier latency 522.

Figure 6:
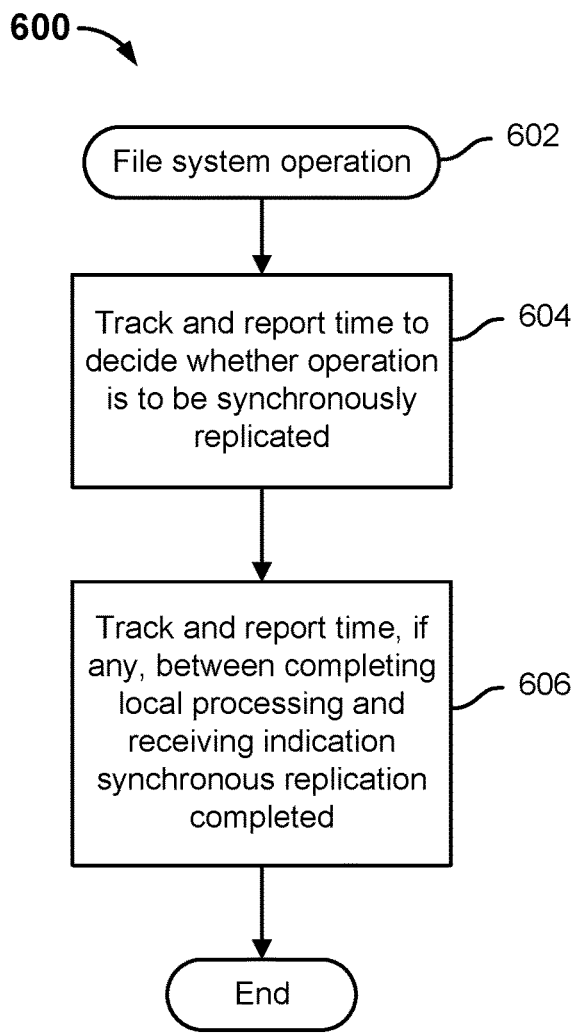
FIG. 6 is a flow chart illustrating an embodiment of a process to report performance data associated with a logical synchronous replication system.

FIG. 6 is a flow chart illustrating an embodiment of a process to report performance data associated with a logical synchronous replication system. In various embodiments, the process 600 of FIG. 6 is implemented by a primary storage system, e.g., storage system 110 of FIGS. 1 and 2. In the example shown, for each file system operation (602), the time to decide whether the operation is to be replicated synchronously (barrier delay) is tracked and reported (604) and, if the operation is replicated synchronously, the delay, if any, between local completion of the operation and receipt of acknowledgement from the secondary storage system (file system operation splitting delay) is tracked and reported (608).

Figure 7:
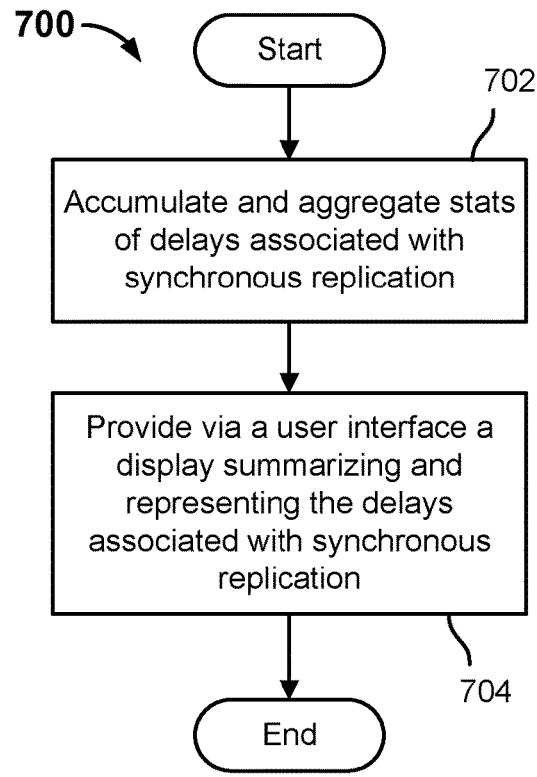
FIG. 7 is a flow chart illustrating an embodiment of a process to determine and provide a display of performance data associated with a logical synchronous replication system.

FIG. 7 is a flow chart illustrating an embodiment of a process to determine and provide a display of performance data associated with a logical synchronous replication system. In various embodiments, the process 700 of FIG. 7 is implemented by a storage system performance analytics service and/or platform, such as performance analytics service 126 of FIG. 1. In the example shown, delays associated with storage system operations, and in particular delays associated with synchronous replication, are accumulated and aggregated (702). In some embodiments, delays are aggregated on a per-VM or per-other application load basis. A display summarizing and representing delays associated with synchronous replication is generated and provided, e.g., via an administrative user interface (704).

Figure 8:
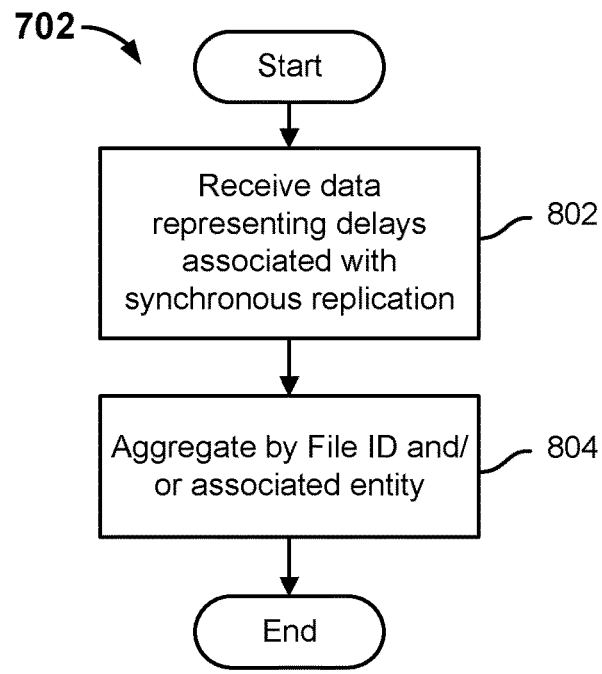
FIG. 8 is a flow chart illustrating an embodiment of a process to gather and process performance data associated with a logical synchronous replication system.

FIG. 8 is a flow chart illustrating an embodiment of a process to gather and process performance data associated with a logical synchronous replication system. In various embodiments, the process of FIG. 8 is implemented by a storage system performance analytics service and/or platform, such as performance analytics service 126 of FIG. 1, e.g., to implement step 702 of the process 700 of FIG. 7. In the example shown, data representing delays associated with synchronous replication are received (802). Data is aggregated on a per-file identifier and/or per-VM (or other application workload) basis (804). In some embodiments, a shared global file identifier is used by both a primary and a secondary storage system to report delays associated with processing file system operation requests associated with a file. In some embodiments, the file is mapped to a VM or other application workload with which the file is associated. The VM or other application workload may be associated with a plurality of files, in which cases statistics associated with the individual files included in the plurality of files may be aggregated and associated with the VM or other application workload.

FIG. 9A is a block diagram illustrating an embodiment of a user interface to display performance statistics associated with a logical synchronous replication system. In the example shown, display 900 includes a plurality of rows and columns. Each row relates to a corresponding application workload. In this example, the workloads are virtual machines. For each workload, corresponding storage performance statistics are listed, such as throughput expressed as input/output operations per second (IOPS) and megabytes per second (MBps). Latency is displayed in this example for both the primary storage system (upper bar) and secondary storage system (lower bar). Different colors (represented in FIG. 9A by different fill patterns) are used to distinguish latency associated with network transmission from latency associated with processing of requests by the storage system.

In the example shown, performance statistics for a load named "VM 2" are shown in row 902. The latency of the primary storage system is shown to be 2.9 ms (on average over both reads and writes, for example) and to be attributable mostly to latency in processing file system operations at the storage system. The latency as reported by the secondary storage system for operations associated with the load "VM 2" is shown to be 3.5 ms, which includes slightly longer network latency associated with replication of the operation from the primary to the secondary storage system and latency associated with processing replicated operations at the secondary storage system.

In some embodiments, latency as shown in FIG. 9A may be an average over all read and write operations. In some embodiments, latency for read operations and latency for write operations may be tracked, reported, and displayed separately.

FIG. 9B is a block diagram illustrating an embodiment of a user interface to display performance statistics associated with a logical synchronous replication system. In the example shown, selecting or rolling over the upper bar in row 902 of the display 900, using cursor 904, is shown to have resulted in a pop-up display window 906 being displayed as an overlay on top of display 900. The pop-up display window 906 shows additional breakout/details of the information summarized by the upper bar associated with the primary storage system. In this example, the 2.9 ms latency shown for the load "VM 2" at the primary storage system is shown to include a 0.1 ms network delay associated with transmitting requests from the associated client/host to the primary storage system and 2.8 ms of latency in process file system operation requests associated with the workload "VM 2" at the primary storage system. In this example, the 2.8 ms latency is shown to be attributable to 1.8 ms latency in accessing flash storage at the primary storage system and 1.0 ms additional delay associated with performing synchronous replication to the secondary storage system. For example, on average the primary storage system may be noting a combined barrier delay and file operation splitting delay of 1.0 ms with respect to synchronous replication of file system operations associated with the load "VM 2".

In some embodiments, the additional latency associated with synchronous replication may be associated with only a subset of operations processed by the primary storage system for the load. For example, in some embodiments the average latencies shown in FIG. 9B may be based on all file system operations, including read operations, whereas the additional latency associated with synchronous replication would be averaged over all operations even though read operations are not replicated or otherwise performed by the secondary storage system. In some alternative embodiments, the additional latency value is averaged only over operations actually synchronously replicated to the second storage system.

FIG. 9C is a block diagram illustrating an embodiment of a user interface to display performance statistics associated with a logical synchronous replication system. In the example shown, selecting or rolling over the lower bar in row 902 of the display 900, using cursor 904, is shown to have resulted in a pop-up display window 908 being displayed as an overlay on top of display 900. The pop-up display window 908 shows additional breakout/details of the information summarized by the lower bar associated with the secondary storage system. In this example, the 3.5 ms latency attributed by the secondary storage system to performing synchronously replicated file system operations associated with the workload "VM 2" is shown to include 0.7 ms of "mirror network" latency to transmit synchronously replicated file system operation requests associated with the workload "VM 2" from the primary storage device to the secondary storage device and 2.8 ms to process those requests at the secondary storage device. The 2.8 ms latency associated with processing at the secondary storage device synchronously replicated file system operation requests associated with the workload "VM 2" is shown in this example to be attributed entirely to flash access latency at the secondary storage system.

In various embodiments, the information shown in FIGS. 9A through 9C may enable a system administrator to determine whether the costs associated with synchronous replication are worthwhile with respect to a given workload and/or to detect potential problems in the configuration, operation, and performance of one or both of the primary storage system and the secondary storage system. For example, an administrator may be able to determine from the information shown in FIGS. 9A through 9C that requests associated with the workload "VM 2" that have been synchronously replicated to the secondary storage system are experiencing a longer than expected amount of flash access latency, which could reflect a problem with the operation or performance of the secondary storage system, or a resource allocation or workload balancing problem, etc.

In various embodiments, techniques disclosed herein enable administrators to assess the costs associated with synchronous replication of a given application workload and/or to troubleshoot potential problems in one or more of the primary storage system, the secondary storage system, and the mirror network that connects them.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A data storage system, comprising:
a communication interface configured to receive, from a data storage system, performance data associated with processing and synchronously replicating file system operation requests; and
a processor coupled to the communication interface and configured to:
aggregate performance data associated with an application-level workload, wherein the performance data includes a first set of data associated with a primary storage system associated with the application-level workload and a secondary storage system associated with the application-level workload; and
provide, via a user interface, a representation of the aggregated performance data for the application-level workload, wherein:
the representation of the aggregated performance data includes a representation of a latency associated with the primary storage system and a representation of a latency associated with the secondary storage system, each representation of latency including factors contributing to each latency; and
at least one of the latency associated with the primary storage system and the latency associated with the secondary storage system includes a measured barrier latency corresponding to an amount of time that it takes to decide whether a given operation is to be replicated synchronously;
wherein the application-level workload comprises a virtual machine;
wherein the processor is further configured to:
create a mapping between the virtual machine and a set of one or more files, by tracking, at a storage system level, data indicating which files are associated with which virtual machines;
use said mapping to aggregate performance data associated with the one or more files;
store the aggregated performance data associated with the one or more files in a manner that associates the aggregated performance data associated with the one or more files with the virtual machine; and
wherein the stored aggregated performance data associated with the one or more files is used to provide at least said first set of data on a per virtual machine basis.

2. The data storage system of claim 1, wherein the performance data includes data associated with performing, at the primary storage system, file system operations associated with the application-level workload.

3. The data storage system of claim 2, wherein said data associated with performing, at the primary storage system, file system operations associated with the application-level workload includes one or more of: contention latency, flash access latency, disk access latency, and network transmission latency.

4. The data storage system of claim 1, wherein the performance data includes data associated with performing file system operations associated with the application-level workload at the secondary storage system.

5. The data storage system of claim 1, wherein the performance data includes data reflecting a latency associated with synchronously replicating, to the secondary storage system, file system operations associated with the application-level workload.

6. The data storage system of claim 5, wherein the processor is further configured to determine that file system operation requests associated with the application-level workload are to be replicated synchronously to the secondary storage system based at least in part on the latency associated with synchronously replicating, to the secondary storage system, file system operations associated with the application-level workload.

7. The data storage system of claim 5, wherein said latency associated with synchronously replicating, to the secondary storage system, file system operations associated with the application-level workload includes a file system operation splitting latency reflecting a difference in time between local completion of a file system operation at the primary storage system and receipt from the secondary storage system of an acknowledgement of completion of the file system operation at the secondary storage system.

8. The data storage system of claim 6, wherein the latency associated with synchronously replicating, to the secondary storage system, file system operations associated with the application-level workload includes the measured barrier latency.

9. The data storage system of claim 1, wherein the processor is further configured to track and report at least one of the measured barrier latency or a file system operation splitting latency.

10. A method, comprising:
   receiving, from a data storage system via a communication interface, performance data associated with processing and synchronously replicating file system operation requests from a primary storage system to a secondary storage system;
   aggregating performance data associated with an application-level workload, wherein the performance data includes a first set of data associated with a primary storage system associated with the application-level workload and a secondary storage system associated with the application-level workload; and
   providing, via a user interface, a representation of the aggregated performance data for the application-level workload, wherein:
      the representation of the aggregated performance data includes a representation of a latency associated with the primary storage system and a representation of a latency associated with the secondary storage system, each representation of latency including factors contributing to each latency; and
      at least one of the latency associated with the primary storage system and the latency associated with the secondary storage system includes a measured barrier latency corresponding to an amount of time that it takes to decide whether a given operation is to be replicated synchronously,
   wherein the application-level workload comprises a virtual machine;
   creating a mapping between the virtual machine and a set of one or more files, by tracking, at a storage system level, data indicating which files are associated with which virtual machines;
   using said mapping to aggregate performance data associated with the one or more files;
   storing the aggregated performance data associated with the one or more files, in a manner that associates the aggregated performance data associated with the one or more files with the virtual machine; and
   wherein the stored aggregated performance data associated with the one or more files is used to provide at least said first set of data on a per virtual machine basis.

11. The method of claim 10, wherein the performance data includes data associated with performing, at the primary storage system, file system operations associated with the application-level workload.

12. The method of claim 11, wherein the data associated with performing, at the primary storage system, file system operations associated with the application-level workload includes one or more of contention latency, flash access latency, disk access latency, and network transmission latency.

13. The method of claim 10, wherein the performance data includes data associated with performing file system operations associated with the application-level workload at the secondary storage system.

14. The method of claim 10, wherein the performance data includes data reflecting a latency associated with synchronously replicating, to the secondary storage system, file system operations associated with the application-level workload.

15. The method of claim 14, wherein said latency associated with synchronously replicating, to the secondary storage system, file system operations associated with the application-level workload includes the measured barrier latency, and the measured barrier latency is associated with determining whether file system operation requests associated with the application-level workload are to be replicated synchronously to the secondary storage system.

16. A computer program product embodied in a non-transitory computer readable medium and comprising computer instructions for:
   receiving, from a data storage system via a communication interface, performance data associated with processing and synchronously replicating file system operation requests from a primary storage system to a secondary storage system;
   aggregating performance data associated with an application-level workload, wherein the performance data includes a first set of data associated with a primary storage system associated with the application-level workload and a secondary storage system associated with the application-level workload; and
   providing, via a user interface, a representation of the aggregated performance data for the application-level workload, wherein:
      the representation of the aggregated performance data includes a representation of a latency associated with the primary storage system and a representation of a latency associated with the second storage system, each representation of latency including factors contributing to each latency; and
      at least one of the latency associated with the primary storage system and the latency associated with the secondary storage system includes a measured barrier latency corresponding to an amount of time that it takes to decide whether a given operation is to be replicated synchronously;
   wherein the application-level workload comprises a virtual machine;
   creating a mapping between the virtual machine and a set of one or more files, by tracking, at a storage system level, data indicating which files are associated with which virtual machines;
   using said mapping to aggregate performance data associated with the one or more files;
   storing the aggregated performance data associated with the one or more files, in a manner that associates the aggregated performance data associated with the one or more files with the virtual machine; and
   wherein the stored aggregated performance data associated with the one or more files is used to provide at least said first set of data on a per virtual machine basis.

* * * * *

UNITED STATES PATENT AND TRADEMARK OFFICE
CERTIFICATE OF CORRECTION

| | |
|---|---|
| PATENT NO. | : 11,386,049 B1 |
| APPLICATION NO. | : 16/115134 |
| DATED | : July 12, 2022 |
| INVENTOR(S) | : Glass et al. |

It is certified that error appears in the above-identified patent and that said Letters Patent is hereby corrected as shown below:

In the Claims

In Column 14, Line(s) 1, Claim 12, before "contention", delete "of" and insert --of:--, therefor.

Signed and Sealed this
First Day of November, 2022

Katherine Kelly Vidal
*Director of the United States Patent and Trademark Office*